United States Patent
Ishino et al.

(10) Patent No.: US 9,694,793 B2
(45) Date of Patent: Jul. 4, 2017

(54) VEHICLE BRAKING CONTROL DEVICE

(71) Applicant: HONDA MOTOR CO., LTD., Tokyo (JP)

(72) Inventors: Keisuke Ishino, Saitama (JP); Shuichi Okada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 14/929,686

(22) Filed: Nov. 2, 2015

(65) Prior Publication Data

US 2016/0129893 A1 May 12, 2016

(30) Foreign Application Priority Data

Nov. 7, 2014 (JP) .................. 2014-226587

(51) Int. Cl.
*B60T 8/17* (2006.01)
*B60T 7/04* (2006.01)
*B60T 8/172* (2006.01)
*B60T 8/40* (2006.01)

(52) U.S. Cl.
CPC .............. *B60T 8/17* (2013.01); *B60T 8/172* (2013.01); *B60T 8/4081* (2013.01); *B60T 7/042* (2013.01); *B60T 2220/04* (2013.01); *B60T 2270/406* (2013.01)

(58) Field of Classification Search
CPC . B60T 7/042; B60T 8/17; B60T 8/172; B60T 8/4081; B60T 2220/04; B60T 2270/406
See application file for complete search history.

(56) References Cited

U.S. PATENT DOCUMENTS

| 2013/0166101 A1* | 6/2013 | Noumura | .............. B60W 10/06 |
| | | | 701/1 |
| 2016/0304079 A1* | 10/2016 | Eto | ........................ B60W 20/10 |

FOREIGN PATENT DOCUMENTS

| JP | 2003-034242 | 2/2003 |
| JP | 3376927 | 2/2003 |
| JP | 2014-104780 | 6/2014 |

OTHER PUBLICATIONS

Japanese Office Action dated Sep. 27, 2016.
Japanese Office Action dated Apr. 4, 2017.

* cited by examiner

*Primary Examiner* — Khoi Tran
*Assistant Examiner* — Robert Nguyen
(74) *Attorney, Agent, or Firm* — Rankin, Hill & Clark LLP

(57) ABSTRACT

A vehicle braking control device includes: a mode switch for making a switching request for braking force characteristics of a vehicle; a motor cylinder device for generating braking force characteristics based on the switching request made by the mode switch; a brake fluid pressure sensor for detecting operation of the brake pedal; and an ECU for prohibiting the braking force characteristics of the motor cylinder device from being changed in a case where the mode switch is operated while the operation of the brake pedal is detected by the brake fluid pressure sensor.

2 Claims, 3 Drawing Sheets

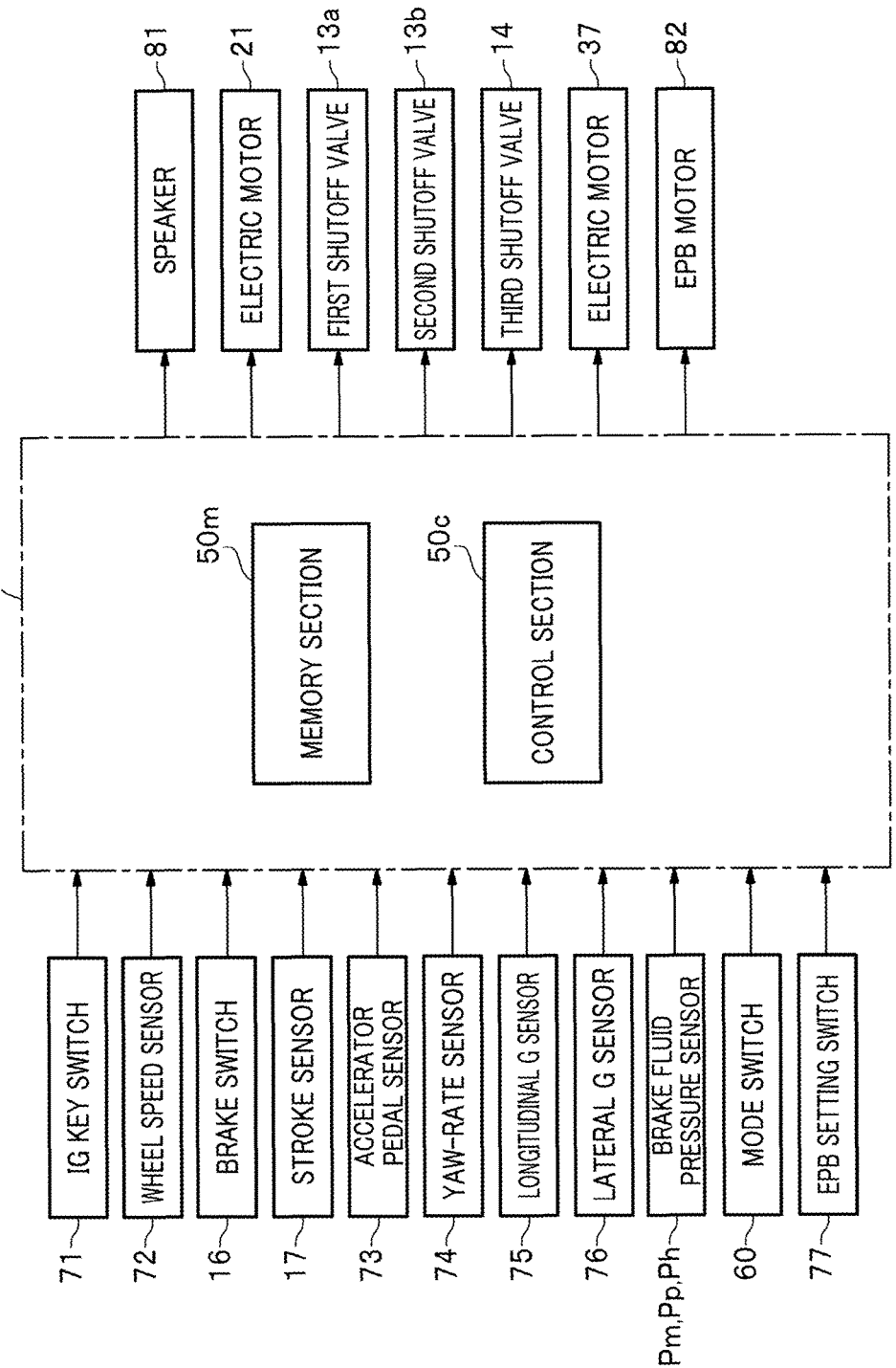

VEHICLE BRAKING CONTROL DEVICE

TECHNICAL FIELD

The present invention relates to a vehicle braking control device having a braking-force-characteristics switching function which does not give a driver an uncomfortable feeling when a control switching request is executed by the driver's operation during braking.

BACKGROUND ART

A device which changes braking force characteristics (brake characteristics) in response to a switch operation made by a driver has heretofore been proposed. Patent Literature 1 describes a configuration including a plurality of control characteristic databases and a braking-force-characteristics switching device which switches the databases, such that braking force characteristics can be changed as desired in accordance with the driver's intention.

CITATION LIST

Patent Literature

[Patent Literature 1] JP 2003-034242 A

SUMMARY OF INVENTION

Technical Problem

A situation where braking force characteristics are changed is such that there are a normal mode, a sport mode emphasizing sportiveness, and other modes, and the driver selects one of these modes as appropriate. In a case where braking force characteristics are changed by the switch operation while the driver is pressing a brake pedal, the braking force characteristics vary in the course of the change even with the same braking operation (brake operation), which in turn causes a problem of giving the driver an uncomfortable feeling.

The present invention has been made to solve the above-described problem, and has an object to provide a vehicle braking control device having a braking-force-characteristics switching function which does not give a driver an uncomfortable feeling when a control switching request is executed by a driver's operation during braking.

Solution to Problem

To achieve the above-described object, a first aspect of the present invention provides a vehicle braking control device including: a characteristics-change requesting unit (for example, a mode switch 60) for making a switching request for braking force characteristics of a vehicle; a braking-force generating unit (for example, a motor cylinder device 20) for generating braking force characteristics based on the switching request made by the characteristics-change requesting unit; an operation detecting unit (for example, brake fluid pressure sensors Pm, Pp, Ph) for detecting operation of the brake pedal; and a control unit (for example, an ECU 50) for prohibiting the braking force characteristics of the braking-force generating unit from being changed in a case where the characteristics-change requesting unit is operated while the operation of the brake pedal is detected by the operation detecting unit.

According to the first aspect, in a case where a switching request for the braking force characteristics of the vehicle is made by the characteristics-change requesting unit while the driver is pressing the brake pedal, since the switching of the braking force characteristics is prohibited, the driver is not given an uncomfortable feeling.

A second aspect of the present invention provides the vehicle braking control device according to the first aspect in which the braking force characteristics include: a first mode (for example, a normal mode) in which the operation of the brake pedal and a braking force are associated with each other; and a second mode (for example, a sport mode) in which the braking force for the same operation of the brake pedal is larger than that in the first mode, and the control unit switches from the second mode to the first mode in a case where communications between the characteristics-change requesting unit and the braking-force generating unit become abnormal during the second mode.

According to the second aspect, it is possible to reduce the uncomfortable feeling to be given to the driver, by switching from the second mode to the first mode, in a case where the communications between the characteristics-change requesting unit and the braking-force generating unit become abnormal during the second mode, in other words, in a case where the current mode is unknown.

Advantageous Effect of Invention

According to the vehicle braking control device of the present invention, even when a control switching request is executed by a driver's operation during braking, the driver is not given an uncomfortable feeling.

BRIEF DESCRIPTION OF DRAWINGS

FIG. 3 is a diagram showing a peripheral configuration of an ECU included in the vehicle braking control device.

DESCRIPTION OF EMBODIMENT

Hereinafter, an embodiment according to the present invention will be described in detail with reference to the drawings.

Figure 1:
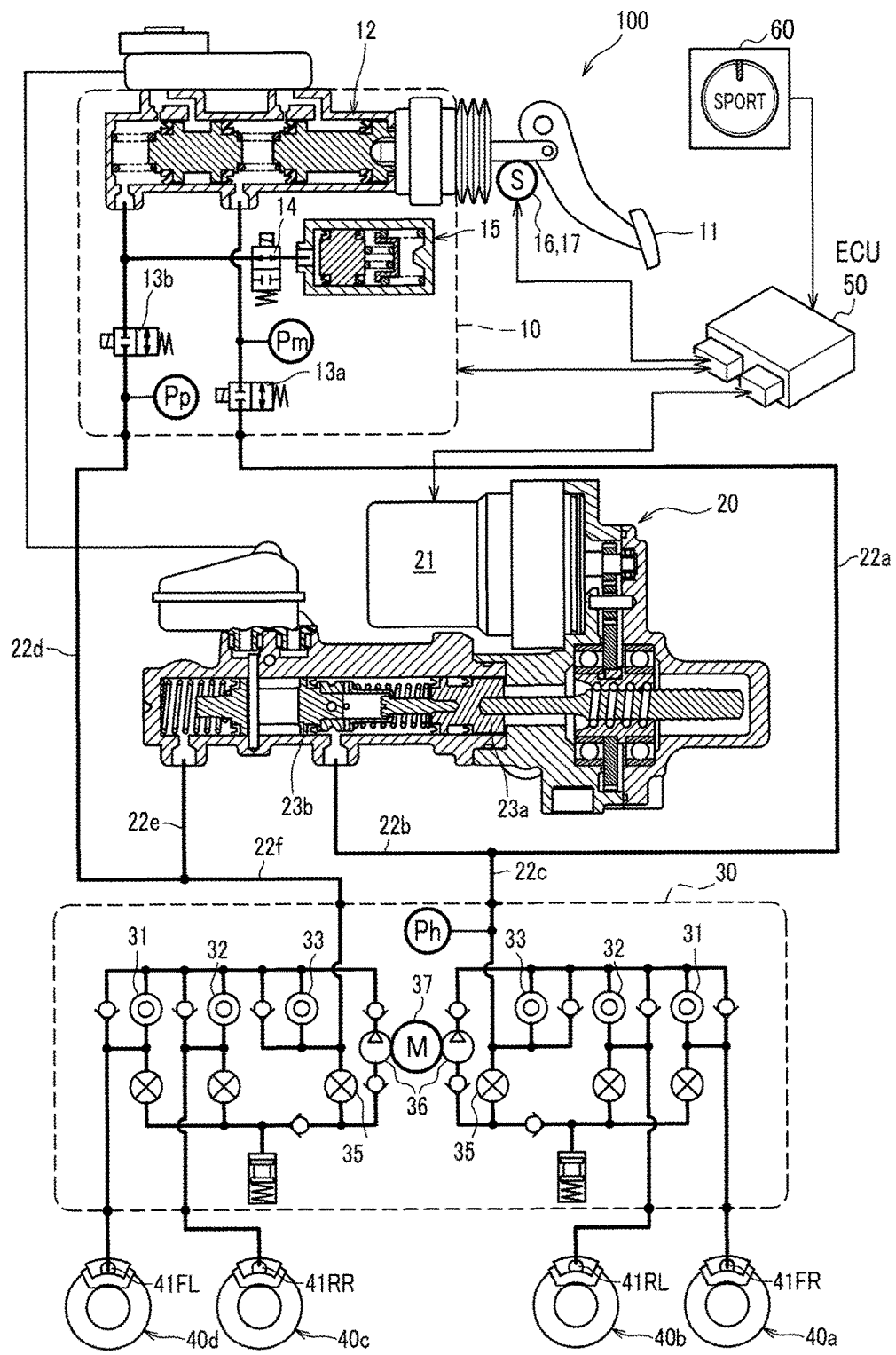
FIG. 1 is a diagram showing a configuration of a vehicle braking control device according to an embodiment.

FIG. 1 is a diagram showing a configuration of a vehicle braking control device according to the embodiment. A vehicle braking control device 100 includes a by-wire brake system which generates braking force through an electric circuit, in addition to an existing brake system which generates braking force through a hydraulic circuit.

As shown in FIG. 1, the vehicle braking control device 100 includes: a fluid pressure generating device 10 configured to receive input of braking operations made by a driver (including a braking application operation and a braking release operation) through a brake pedal 11; a motor cylinder device 20 configured to generate brake fluid pressure based on an electrical signal according to at least the braking operation; a vehicle stability assist device (VSA device) 30 configured to assist to stabilize the behavior of the vehicle based on the brake fluid pressure generated by the motor cylinder device 20; disk brake mechanisms 40a to 40d; a mode switch 60 (a characteristics-change requesting unit) provided on an instrument panel or the like in a vehicle interior and configured to make a switching request for braking force characteristics of the vehicle; and an electronic control unit (ECU) 50 configured to change the braking force characteristics. The fluid pressure generating device 10 and the motor cylinder device 20, which constitute the by-wire brake system, are electrically connected to the ECU 50 through electric wires. Note that the name "VSA" is a registered trademark.

The fluid pressure generating device 10, the motor cylinder device 20, and the VSA device 30 are connected to and communicate with one another by pipe tubes 22a to 22f through which to cause a brake fluid to flow.

The fluid pressure generating device 10 includes a master cylinder 12 configured to convert pedal effort input by the driver using the brake pedal 11 to the brake fluid pressure, a first shutoff valve 13a, a second shutoff valve 13b, a third shutoff valve 14, and a stroke simulator 15. Note that the stroke simulator 15 is a component installed to solve a problem that when the first shutoff valve 13a and the second shutoff valve 13b are shut off, there is no way for the brake fluid discharged from the master cylinder 12 by pressing the brake pedal 11, and the "pressing feeling" of the brake pedal 11 is also lost.

The motor cylinder device 20 generates brake fluid pressure in accordance with, or irrespective of, the brake fluid pressure generated by the master cylinder 12. The motor cylinder device 20 includes first and second slave pistons 23a, 23b configured to generate the brake fluid pressure by receiving rotational drive force of an electric motor 21.

The VSA device 30 includes: in-valves 31, 32; regulator valves 33; suction valves 35; a pump 36 for pressuring the brake fluid; an electric motor 37 configured to drive the pump 36; and the like.

As an operation detecting unit for detecting operation of the brake pedal 11, the vehicle braking control device 100 includes: brake fluid pressure sensors Pm, Pp, Ph configured to detect the brake fluid pressure generated by the master cylinder 12; a brake switch 16; and a stroke sensor 17. At least one of the brake switch 16, the stroke sensor 17, and the brake fluid pressure sensors Pm, Pp, Ph can detect the operation of the brake pedal 11.

(Basic Operation of Vehicle Braking Control Device 100)

Next, the basic operation of the vehicle braking control device 100 will be described.

In the vehicle braking control device 100 in normal operation of the ECU 50 (see FIG. 3), which controls the motor cylinder device 20 and the by wire, when the driver presses the brake pedal 11, what is termed as the by-wire brake system is activated. Specifically, in the normal operation, when the driver presses the brake pedal 11, the vehicle braking control device 100 activates the disk brake mechanisms 40a to 40d, which brake the respective wheels, by using the brake fluid pressure generated by the motor cylinder device 20, in a state where the first shutoff valve 13a and the second shutoff valve 13b have shut off the communications between the master cylinder 12 and the disk brake mechanisms 40a to 40d (wheel cylinders 41FR, 41RL, 41RR, 41FL).

For this reason, the vehicle braking control device 100 is favorably applicable to vehicles in which generation of a negative pressure by an internal combustion engine is small, or no negative pressure by an internal combustion engine exists, and vehicles equipped with no internal combustion engine per se, like electric vehicles (including fuel cell vehicles), hybrid vehicles, and the like, for example.

Incidentally, in the normal operation, the first shutoff valve 13a and the second shutoff valve 13b are closed, while the third shutoff valve 14 is opened, such that the brake fluid flows from the master cylinder 12 into the stroke simulator 15. Accordingly, even though the first shutoff valve 13a and the second shutoff valve 13b have been shut off, the brake fluid moves to generate stroke of the brake pedal 11.

On the other hand, in the vehicle braking control device 100 in abnormal operation in which the motor cylinder device 20 or the ECU 50 is malfunctioning, when the driver presses the brake pedal 11, the existing hydraulic brake system is activated. Specifically, in the abnormal operation, when the driver presses the brake pedal 11, the vehicle braking control device 100 opens the first shutoff valve 13a and the second shutoff valve 13b and closes the third shutoff valve 14, to transmit the brake fluid pressure generated by the master cylinder 12 to the disk brake mechanisms 40a to 40d (the wheel cylinders 41FR, 41RL, 41RR, 41FL), thereby activating the disk brake mechanisms 40a to 40d.

(Examples of Braking Force Characteristics)

Figure 2A:
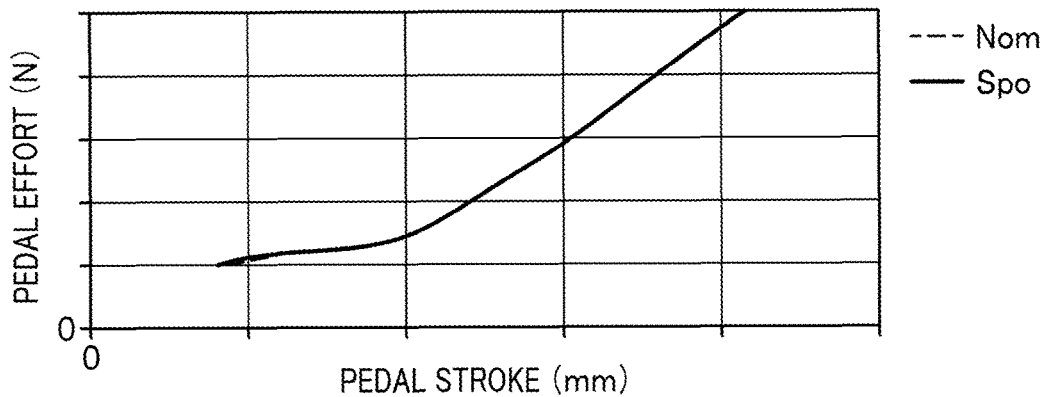
FIGS. 2A to 2C are graphs showing a relation between a pedal effort and a deceleration as an example of braking force characteristics.
Figure 2B:
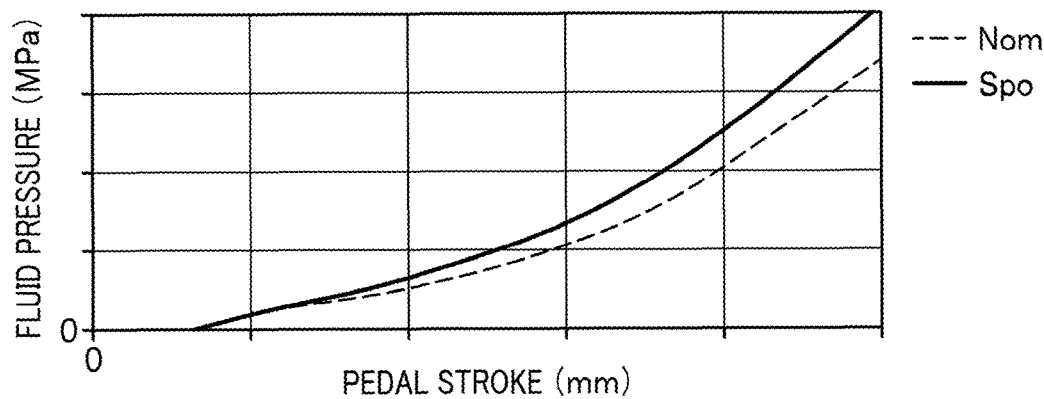
Figure 2C:
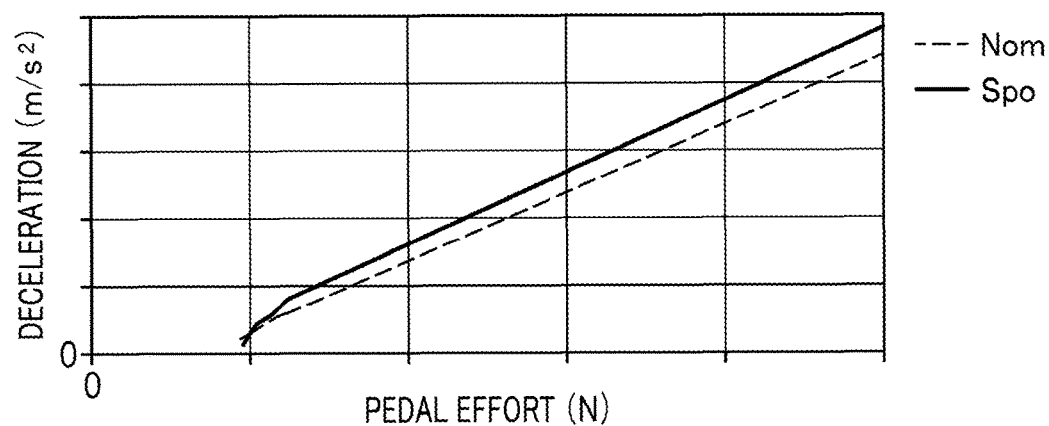

FIGS. 2A to 2C are graphs showing a relation between a pedal effort and a deceleration as an example of the braking force characteristics. FIG. 2A is a graph showing a relation between a pedal stroke of the fluid pressure generating device 10 and the pedal effort of the pedal, FIG. 2B is a graph showing a relation between a pedal stroke of the motor cylinder device 20 and the fluid pressure, and FIG. 2C is a graph showing a relation between the pedal effort and the deceleration of the vehicle body, based on FIG. 2A and FIG. 2B.

As for the braking force characteristics, the pedal effort relative to the pedal stroke (see FIG. 2A) and the fluid pressure relative to the pedal stroke (see FIG. 2B) are determined in accordance with test conditions and the like, and the pedal effort and the deceleration of the vehicle body (see FIG. 2C) are set. The braking force characteristics include a normal mode (Nom, a first mode) and a sport mode (Spo, a second mode). The sport mode is a mode in which the braking force (the fluid pressure/the deceleration) relative to the same operation of the brake pedal is larger than that in the normal mode. As shown in FIG. 2B, the fluid pressure relative to the pedal stroke in the sport mode is larger than that in the normal mode. As a result, as shown in FIG. 2C, the deceleration relative to each pedal effort in the sport mode is larger than that in the normal mode. Since the braking force is large in the sport driving, the driving pleasure of the driver becomes much higher. Note that in FIG. 2A, the normal mode and the sport mode are supposed to have the same characteristics.

The braking force characteristics are stored in a memory section of the ECU 50 in advance. The ECU 50 is capable of switching from the normal mode to the sport mode, and from the sport mode to the normal mode, based on a switching signal from the mode switch 60.

The ECU 50 of the embodiment prohibits the braking force characteristics of the braking-force generating unit (for example, the motor cylinder device 20) from being changed in a case where the mode switch 60 (the characteristics-change requesting unit) is operated while the operation of the brake pedal 11 is detected by the operation detecting unit (for example, the brake fluid pressure sensors Pm, Pp, Ph, the brake switch 16, the stroke sensor 17), which detect the operation of the brake pedal 11. In other words, when the mode switch 60 is turned on (when the mode switch 60 is pressed down) with the brake pedal 11 being kept to be pressed, the ECU 50 does not immediately switch the mode, or does not switch the map of FIG. 2B from a dashed line to a solid line (or vice versa), but switches the mode when the brake pedal 11 is released (or when the brake switch 16 is turned off, or the like). This control provides an effect that even when the control switching request is executed by a driver's operation while the driver makes braking operation, the driver is not given an uncomfortable feeling, such as a sudden change in efficiency of the braking, during the braking.

In addition, in a case where the communications between the characteristics-change requesting unit and the braking-force generating unit become abnormal during the sport mode, the ECU 50 switches from the sport mode to the normal mode. This can reduce the uncomfortable feeling to be given to the driver, by switching from the sport mode to the normal mode, in a case where the communications between the characteristics-change requesting unit and the braking-force generating unit become abnormal during the sport mode, in other words, in a case where the current mode is unknown.

Moreover, the ECU 50 may switch the mode to the normal mode at the time of the next braking operation in a case where the current mode is unknown, and may give the driver a notification or alert of switching to the normal mode on a meter or the like.

(Peripheral Configuration of ECU)

FIG. 3 is a diagram showing a peripheral configuration of the ECU included in the vehicle braking control device. Referring to FIG. 3, the peripheral configuration of the ECU 50 included in the vehicle braking control device 100 will be described. FIG. 1 is also referred to as necessary.

As shown in FIG. 3, the ECU 50 is connected to an ignition key switch (hereinafter, referred to as an "IG key switch") 71, a wheel speed sensor 72, the brake switch 16, the stroke sensor 17, an accelerator pedal sensor 73, a yaw-rate sensor 74, a longitudinal G sensor 75, a lateral G sensor 76, the brake fluid pressure sensors Pm, Pp, Ph, the mode switch 60, and an EPB setting switch 77, as an input system. Note that EPB is an acronym of Electric Parking Brake.

The IG key switch 71 is a switch to be operated to supply electric power from an in-vehicle battery (not shown) to each part of the vehicle. When the IG key switch 71 is turned on, the electric power is supplied to the ECU 50, so that the ECU 50 is activated.

The wheel speed sensor 72 has a function of detecting a rotational speed of each wheel (a wheel speed). A wheel speed signal of each wheel detected by the wheel speed sensor 72 is sent to the ECU 50.

The brake switch 16 has a function of detecting whether or not the brake pedal 11 is being pressed. The stroke sensor 17 has a function of detecting an amount of operation (an amount of stroke) of the brake pedal 11 by the driver. Signals detected by the brake switch 16 and the stroke sensor 17 are sent to the ECU 50.

The accelerator pedal sensor 73 has a function of detecting an amount of pressing an accelerator pedal (not shown) by the driver. A signal indicating the amount of pressing the accelerator pedal detected by the accelerator pedal sensor 73 is sent to the ECU 50.

The yaw-rate sensor 74 has a function of detecting a yaw rate generated in the vehicle. A signal indicating the yaw rate detected by the yaw-rate sensor 74 is sent to the ECU 50.

The longitudinal G sensor 75, which is an accelerometer, has a function of detecting a longitudinal G (a longitudinal acceleration) generated in the vehicle. A signal indicating the longitudinal G detected by the longitudinal G sensor 75 is sent to the ECU 50.

The lateral G sensor 76, which is an accelerometer, has a function of detecting a lateral G (a lateral acceleration) generated in the vehicle. A signal indicating the lateral G detected by the lateral G sensor 76 is sent to the ECU 50.

The brake fluid pressure sensors Pm, Pp, Ph have a function of detecting fluid pressures in portions including the pipe tubes 22*a* to 22*f*. Signals indicating brake fluid pressures detected respectively by the brake fluid pressure sensors Pm, Pp, Ph are sent to the ECU 50.

The mode switch 60 is a switch provided on the instrument panel (not shown) or the like in the vehicle interior, and is normally in the normal mode (the first mode). By pressing down the mode switch 60, the mode is switched to the sport mode (the second mode).

The EPB setting switch 77 is a switch provided on the instrument panel or the like in the vehicle interior, and configured to be operated to set on and off the activation of the EPB.

Meanwhile, as shown in FIG. 3, the ECU 50 is connected to a speaker 81, which is used to give various alerts, the electric motor 21 of the motor cylinder device 20, the first shutoff valve 13*a*, the second shutoff valve 13*b*, the third shutoff valve 14, the electric motor 37, and EPB motors 82 provided for the respective disk brake mechanisms 40*a* to 40*d* and configured to drive parking mechanisms (not shown) for activating calipers (not shown), as an output system.

As shown in FIG. 3, the ECU 50 includes: a memory section 50*m* configured to store the braking force characteristics such as the normal mode and the sport mode; and a control section 50*c*.

The ECU 50 is configured by a microcomputer including a central processing unit (CPU), a read only memory (ROM), a random access memory (RAM), and other components. The microcomputer reads and executes programs and data stored in the ROM and the RAM.

The ECU 50 of the embodiment prohibits the braking force characteristics of the motor cylinder device 20 (the braking-force generating unit) from being changed, in a case where the mode switch 60 (the characteristics-change requesting unit) is operated while the operation of the brake pedal 11 is detected by at least one of the brake switch 16, the stroke sensor 17, and the brake fluid pressure sensors Pm, Pp, Ph, which are the operation detecting unit for detecting the operation of the brake pedal. That is, instructions sent to the electric motor 21 can be maintained. In other words, in a case where a switching request for the braking force characteristics of the vehicle is made by the characteristics-change requesting unit while the driver is pressing the brake pedal 11, since the switching of the braking force characteristics during braking is prohibited, the driver is not given an uncomfortable feeling in which the braking force is changed. More specifically, even when the mode is requested to be switched to the sport mode during travel in the normal mode, the map of FIG. 2B is not switched from the dashed line to the solid line, the change in the deceleration from the dashed line to the solid line shown in FIG. 2C does not occur.

Although the embodiment according to the present invention has been described regarding two types of modes, that is, the normal mode and the sport mode, the present invention is not limited to these modes. For example, the embodiment according to the present invention may include an economy mode and a snow mode. Specifically, in the case of the snow mode, braking force characteristics in which the efficiency of the brake is lower than that in the normal mode may be included.

REFERENCE SIGNS LIST

10: fluid pressure generating device
11: brake pedal

12: master cylinder
13a: first shutoff valve
13b: second shutoff valve
14: third shutoff valve
15: stroke simulator
16: brake switch (operation detecting unit)
17: stroke sensor (operation detecting unit)
20: motor cylinder device (braking-force generating unit)
21: electric motor
30: VSA device
36: pump
37: electric motor
50: electronic control unit (ECU)
50m: memory section
50c: control section
60: mode switch (characteristics-change requesting unit)
100: vehicle braking control device
Pm, Pp, Ph: brake fluid pressure sensor (operation detecting unit)

The invention claimed is:

1. A vehicle braking control device comprising:
a characteristics-change requesting unit for making a switching request for braking force characteristics of a vehicle;
a braking-force generating unit for generating braking force characteristics based on the switching request made by the characteristics-change requesting unit;
an operation detecting unit for detecting operation of a brake pedal;
a control unit for prohibiting the braking force characteristics of the braking-force generating unit from being changed in a case where the characteristics-change requesting unit is operated while the operation of the brake pedal is detected by the operation detecting unit.

2. The vehicle braking control device according to claim 1, wherein
the braking force characteristics include: a first mode in which the operation of the brake pedal and a braking force are associated with each other; and a second mode in which the braking force for the same operation of the brake pedal is larger than that in the first mode, and
the control unit switches from the second mode to the first mode in a case where communications between the characteristics-change requesting unit and the braking-force generating unit become abnormal during the second mode.

* * * * *